United States Patent
Orhon et al.

(10) Patent No.: US 11,392,799 B2
(45) Date of Patent: Jul. 19, 2022

(54) METHOD FOR IMPROVING TEMPORAL CONSISTENCY OF DEEP NEURAL NETWORKS

(71) Applicant: Apple Inc., Cupertino, CA (US)

(72) Inventors: Atila Orhon, Cupertino, CA (US);
Marco Zuliani, San Jose, CA (US);
Vignesh Jagadeesh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/821,315

(22) Filed: Mar. 17, 2020

(65) Prior Publication Data

US 2021/0073589 A1    Mar. 11, 2021

Related U.S. Application Data

(60) Provisional application No. 62/897,820, filed on Sep. 9, 2019.

(51) Int. Cl.
| | | |
|---|---|---|
| G06K 9/62 | (2006.01) | |
| G06N 3/08 | (2006.01) | |
| G06N 3/04 | (2006.01) | |
| G06V 10/96 | (2022.01) | |

(52) U.S. Cl.
CPC ......... G06K 9/6262 (2013.01); G06K 9/6256 (2013.01); G06N 3/04 (2013.01); G06N 3/08 (2013.01); G06V 10/96 (2022.01)

(58) Field of Classification Search
CPC ............... G06K 9/6262; G06K 9/6256; G06K 9/00993; G06K 9/00744; G06K 9/6273; G06N 3/08; G06N 3/04; G06N 3/0454

USPC ......................................................... 382/159
See application file for complete search history.

(56) References Cited

U.S. PATENT DOCUMENTS

| | | | |
|---|---|---|---|
| 10,547,858 B2* | 1/2020 | Wang | H04N 19/86 |
| 2018/0130178 A1* | 5/2018 | Wang | H04N 19/86 |
| 2020/0097742 A1* | 3/2020 | Ratnesh Kumar | G06N 3/0454 |
| 2021/0073575 A1* | 3/2021 | Liu | G06T 5/50 |

OTHER PUBLICATIONS

Eilerstein, et al., "Single-frame Regularization for Temporally Stable CNNs," arXiv:1902.10424v2, Jun. 8, 2019.
Lai, et al., "Learning Blind Video Temporal Consistency," arXiv:1808.00449v1, Aug. 1, 2018.

\* cited by examiner

Primary Examiner — Juan A Torres
(74) Attorney, Agent, or Firm — Blank Rome LLP

(57) ABSTRACT

Training a network for image processing with temporal consistency includes obtaining un-annotated frames from a video feed. A pretrained network is applied to the first frame of first frame set comprising a plurality of frames to obtain a first prediction, wherein the pretrained network is pretrained for a first image processing task. A current version of the pretrained network is applied to each frame of the first frame set to obtain a first prediction. A content loss term is determined, based on the first prediction and a current prediction for the frame, based on the current network. A temporal consistency loss term is also determined based on a determined consistency of pixels within each frame of the first frame set. The pretrained network may be refined based on the content loss term and the temporal term to obtain a refined network.

20 Claims, 6 Drawing Sheets

METHOD FOR IMPROVING TEMPORAL CONSISTENCY OF DEEP NEURAL NETWORKS

BACKGROUND

This disclosure relates generally to the field of digital image capture, and more particularly to the training and utilization of machine learning models to assist in various image processing tasks, while providing temporal consistency.

With the proliferation of camera enabled mobile devices, users can capture numerous photos and videos of any number of people and objects in many different settings and geographic locations. Current technology allows this video data to be enhanced by various image processing features, such as style transfer, HDR tone mapping, semantic segmentation, image completion, computer graphics, and the like. Often times, a deep neural network may be trained to handle (or assist in the performance of) one or more of these various image processing tasks. Generally, these neural networks are trained using single frame training images. As such, applying these neural network models on a frame-by-frame basis may produce temporally-inconsistent results, e.g., when applied to a video sequence of image frames.

While some networks are trained to solve temporal inconsistency for particular image processing tasks, other neural networks are referred to as "blind," i.e., they are task-agnostic. However, such blind methods often involve additional algorithmic complexities that may lead to increases in latency, power, and memory requirements, which is undesirable, especially in devices with limited resources. Other approaches utilizing neural networks may attempt to improve temporal consistency by regularizing how the network behaves on a per-frame basis, i.e., rather than correcting a sequence after it has been processed. However, these methods have certain limitations, and may not work effectively on the multitude of unique video sequences that may be captured "in the wild" on real-world devices.

Thus, what is needed are techniques to develop neural networks that are configured to perform one task at a time, e.g., image processing-related tasks, which may be initialized from a baseline single-frame convolutional neural network (CNN), e.g., without consideration of temporal consistency, and then fine-tune the baseline CNN, preferably in a self-supervised manner, to learn temporal consistency as a secondary task, while incurring no additional inference time complexity over the baseline CNN.

SUMMARY

In one embodiment, a method for training a network for image processing with temporal consistency is described. The method includes obtaining a first plurality of frames from a video feed, wherein the first plurality of frames are un-annotated. A pretrained network is applied to the first frame of first frame set to obtain a first prediction, wherein the pretrained network is pretrained for a first image processing task. A learning network is applied to each frame of the first frame set to obtain a first set of current predictions. For the first frame of the first frame set, a "content" loss term is determined based on the first prediction coming from the pretrained network and a current prediction, coming from the learning network, of the first set of current predictions. A temporal term is also determined based on a consistency of corresponding predicted pixels across each frame pairs of the first frame set. A current network (e.g., a learning version of the pre-trained network) may be refined based on the content loss term and the temporal term to obtain a refined network.

In another embodiment, the method may be embodied in computer executable program code and stored in a non-transitory storage device. In yet another embodiment, the method may be implemented in an electronic device, such as an image capture device.

DETAILED DESCRIPTION

Figure 1:
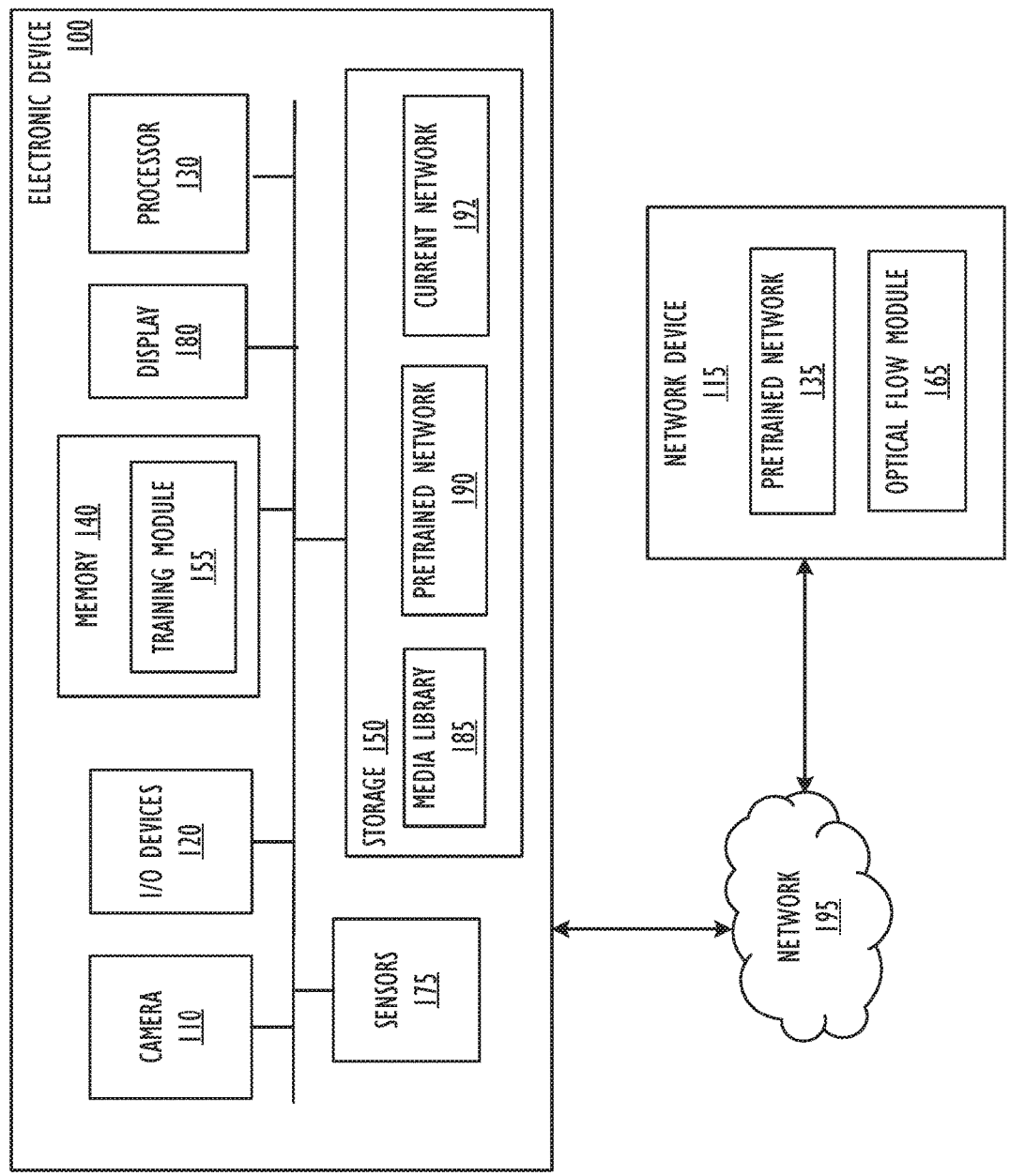
FIG. 1 shows, in block diagram form, a simplified electronic device according to one or more embodiments.

This disclosure pertains to systems, methods, and computer readable media for techniques for providing temporal consistency in a neural network that is trained to perform image processing tasks on video data. According to embodiments disclosed herein, a single network may be trained to perform a particular image processing task and be further fine-tuned to provide temporal consistency across frames of video data that are processed for the image processing task. Further, embodiments described in this disclosure provide a self-supervised, multi-tasked learning approach, wherein a network is trained for an image processing task, along with a temporal consistency task, without losing performance on either task. Moreover, the embodiments described herein do not require annotated training data and do not incur any additional inference time complexity or processing costs over a baseline.

According to one or more embodiments, video data may be parsed into batches of image frames. Each batch may include a set of image frames from which a network may be trained to learn temporal consistency. Initially, a pretrained network is applied to a first frame of the first batch to obtain an initial prediction. The parameter values associated with the initial prediction may be cached for later reference. The current version of the network may then be applied to the all frames in the batch using a shared weight implementation to obtain a set of current predictions. That is, the parameter values will be shared across predictions. A content loss term may be determined based on the initial prediction and a current prediction for the first frame. A temporal consistency loss term may be determined for each frame based on the current prediction for the first frame and the current predictions for the proceeding frames in the batch. According to one or more embodiments, the temporal consistency loss term may determine which pixels in the frames should be utilized (or to what extent each pixel should be utilized) for determining temporal consistency, e.g., via a so-called validity mask. After determining the calculated loss in the temporal term for each frame, the pretrained network may be refined based on the content loss term and the temporal consistency loss term. As an example, the content loss term and temporal consistency loss term may be weighted against each other using an optimizer to obtain refined values which may then be fed into the current network. The process may continue for each remaining batch, where the first frame of each batch is processed using the pretrained network prior to any refinement. According to one or more embodiments, batches may be processed until a convergence is reached.

For purposes of this description, un-annotated frames may refer to video image frames which are used as training data, but have not been altered, annotated, or augmented for the purpose of training.

For purposes of this description, a self-supervised network may refer to a neural network which does not require annotated frames for training. The supervision may be derived from intrinsic signals in data such as temporal correspondence, temporal order, spatial order, color information, or the like.

For purposes of this description, a pretrained network may refer to a neural network that has been trained for a particular image processing task. According to one or more embodiments, the pretrained network is not trained for temporal consistency.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram or flow chart is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It should also be appreciated that such development efforts might be complex and time consuming, but would nevertheless be a routine undertaking for those of ordinary skill in the art of image capture having the benefit of this disclosure.

Referring to FIG. 1, a simplified block diagram of an electronic device 100 is depicted in accordance with one or more embodiments of the disclosure. Electronic device 100 may be part of a multifunctional device such as a mobile phone, tablet computer, personal digital assistant, portable music/video player, or any other electronic device that includes a camera system. Further, electronic device 100 may be part of a larger system of components that includes a camera 110. Electronic device 100 may be connected to other devices across a network 195 such as network device 115, and/or other mobile devices, tablet devices, desktop devices, as well as network storage devices such as servers and the like. Electronic device 100 may be configured to capture video image data corresponding to a scene and provide image processing functionality for the captured video data.

Electronic device 100 may include one or more sensors 175, which may provide information about a surrounding environment, such as contextual information. For example, sensors 175 may include sensors configured to detect brightness, depth, location, and other information regarding the environment. Electronic device 100 may also include a display 180, which may be an additive display. For example, display 180 may be a transparent or semi-opaque display, such as a heads-up display, by which an image may be projected over a transparent surface. Thus, display 180 may be comprised of a projector and a surface, or may just include the projector. Further, display 180 may be a transparent display, such as an LCD display and/or a head mounted display. Electronic device 100 may additionally include I/O devices 120, such as speakers and the like. In one or more embodiments, the various I/O devices 120 may be used to assist in image capture. According to one or more embodiments, I/O devices 120 may additionally include a touch screen, mouse, track pad, and the like.

Electronic device 100 may include a processor 130. Processor 130 may be a central processing unit (CPU). Processor 130 may alternatively, or additionally, include a system-on-chip such as those found in mobile devices and include zero or more dedicated graphics processing units (GPUs). Electronic device 100 may also include memory 140 and storage 150. Memory 140 and storage 150 may each include one or more different types of memory, which may be used for performing device functions in conjunction with processor 130. For example, memory 140 may include cache, ROM, and/or RAM. Memory 140 may store various programming modules during execution, including media management module 155. In one or more embodiments, storage 150 may comprise cache, ROM, RAM, and/or non-volatile memory, and may store media items in a media library 185. Media library 185 may include various types of media items, such as image files, video files, audio files, enhanced image files, and the like. An enhanced image may include a "snapshot image", a first subset of image from a pre-capture image sequence, and a second subset of image from a post-capture image sequence, and wherein the first and second subsets of images may be played back as a video sequence (which may also include the snapshot image itself). The enhanced image may include a concurrently captured audio recording, according to one or more embodiments. Further, according to one or more embodiments, media library 185 may include a combination of types of media items. Media library 185 may include, for example, images captured by camera 110, as well as images received by electronic devices 100, for example by transmission.

Storage 150 may also include a pretrained network 190 according to one or more embodiments. The pretrained network may be a neural network, such as a convolutional neural network, that has been trained for one or more image processing tasks, such as style transfer, HDR tone mapping, semantic segmentation, image completion, computer graphics, and the like. The pretrained network may be trained based on single-frame image data. In addition, storage 150 may include a refined network 192. The pretrained network 190 has not been trained for temporal consistency, according to one or more embodiments. In one or more embodiments, the current network may be a refined version of the pretrained network 190, which has been trained for temporal consistency by the training module 155. Current network 192 may then be utilized to perform image processing functionality in a temporally consistent manner across video frames. According to one or more embodiments, once the current network 192 is trained, the current network 192 may be used in place of the pretrained network 190 because the current network 192 provides improved functionality from the pretrained network 190.

Memory 140 may include instructions, such as computer readable code executable by processor 130 to perform various actions. For example, training module 155 may include instructions that cause electronic device 100 to assist in improving temporal consistency in deep neural networks utilized for image processing functionality. As will be described below with respect to FIGS. 2-4, the training module 155 may achieve temporal consistency by initializing from a baseline single-frame neural network (e.g., pretrained network 190) trained without consideration of temporal consistency, and fine tuning the CNN on video data in a self-supervised manner.

Generally, the training module 155 reinterprets temporal consistency as a new task to be learned and implements the training of a neural network using a multitask paradigm known as "Learning Without Forgetting." The task for which the pretrained network has been trained is preserved by penalizing a deviation between a refined version of the pretrained network (e.g., refined network 192) as it is trained on new data, and a prediction made by the pretrained network 190. The result is a self-supervised multi-task learning scheme that may be used to fine-tune single-frame neural networks to be temporally consistent on image processing tasks without additional inference complexity.

According to one or more embodiments, the electronic device 100 may utilize resources of a network device 115. For example, the network device 115 may include storage or processing resources which may be utilized. Although network device 115 is depicted as a single device, it should be understood that network device 115 may be comprised of multiple devices. Further, the various components and modules described as being performed or hosted by network device 115 may be distributed across multiple network device 115 in any manner. Moreover, according to one or more embodiments, the various modules and components described as being hosted by network device 115 may alternatively or additionally be hosted by electronic device 100.

In one or more embodiments, network device 115 may include a pretrained network 135. In one or more embodiments, pretrained network 135 may represent a version of the pretrained network that may be accessed remotely by the electronic device 100. The pretrained network 135 may be similar or the same to the pretrained network 190 described above. Network device 115 may also include an optical flow module 165. According to one or more embodiments, optical flow may be utilized by training module 155 to determine a temporal term for each frame of training data based on an initial prediction from the pretrained network 190 and current predictions from refined network 192. Optical flow may be utilized to derive temporal correspondence which will serve as self-supervision. Optical flow may also be utilized to determine a subset of pixels which should be considered for training data, according to one or more embodiments. Optical flow may be determined by optical flow module 165 and may be utilized to determine conditions which make a particular pixel valid or invalid for use in determining temporal consistency, for example, either because the data is valid or invalid. Bi-directional optical flow may be used to determine disocclusion, high sensitivity regions at motion boundaries, incorrect optical flow estimation, and the like, as will be described below with respect to FIG. 5. Optical flow is depicted as available in a remote network device 115, but optical flow module 165 may additionally, or alternatively, be located in the electronic device 100, according to one or more embodiments.

Figure 2:
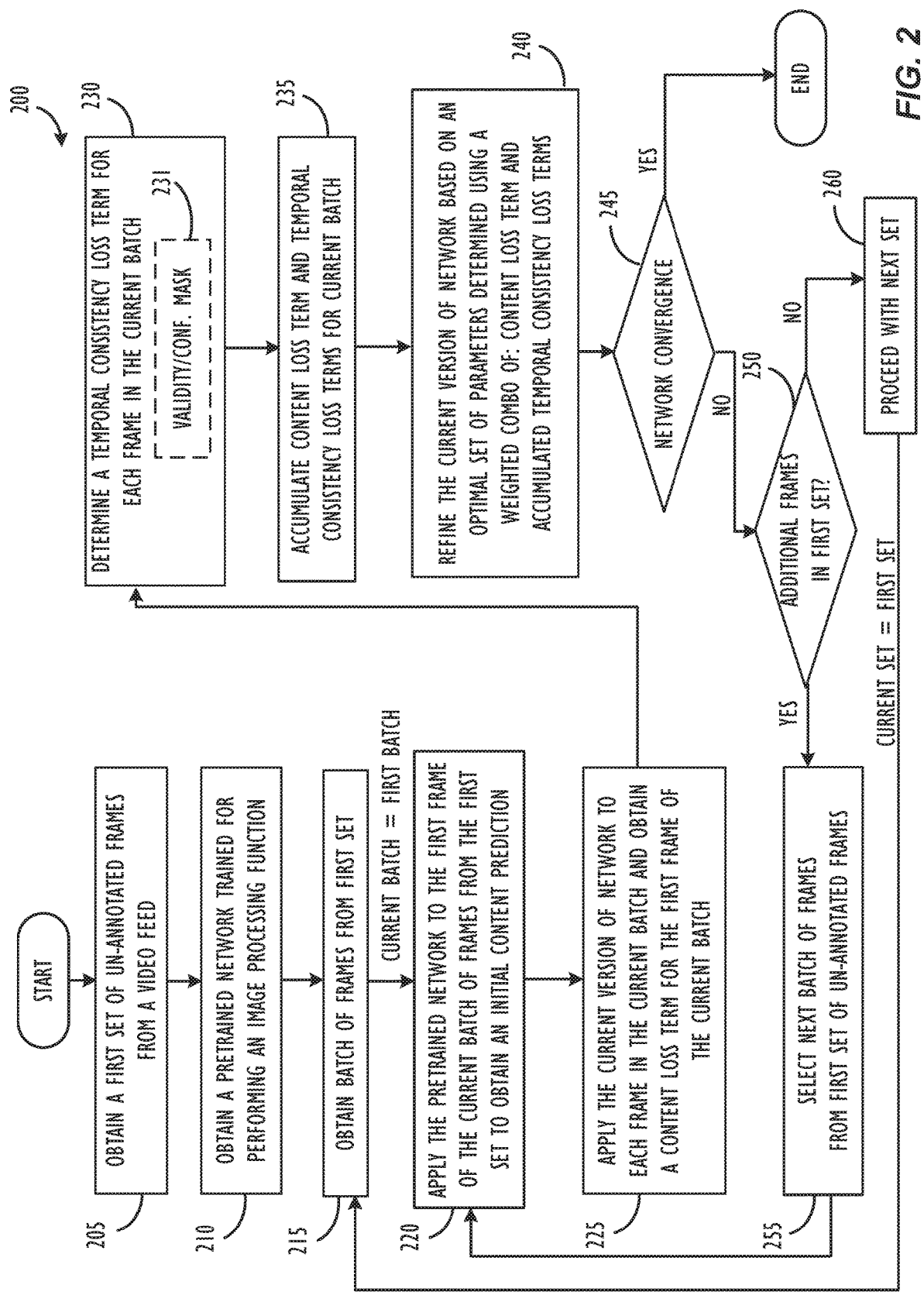
FIG. 2 shows, in flowchart form, an overview of a method for refining a neural network for employing an image processing function with temporal consistency, according to one or more embodiments.

FIG. 2 shows, in flowchart form, an overview of a method 200 for refining a neural network for employing an image processing function with temporal consistency, according to one or more embodiments. With respect to each of the flowcharts described below (e.g., FIGS. 2-4), although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be performed by alternative components, according to one or more embodiments.

Flowchart 200 begins at block 205, where training module 155 obtains a first set of un-annotated frames from a video feed. According to one or more embodiments, the un-annotated frames may be frames from video image data that have not been annotated for purposes of training a temporally consistent neural network. According to one or more embodiments, the neural network may be refined by walking through sets of video image data.

The flowchart continues at block 210, where the training module 155 obtains a pretrained network trained for an image processing function. According to one or more embodiments, the pretrained network may be any kind of deep learning neural network which may intake video image frames and make a prediction which may be utilized for any kind of video image processing functionality. As described above, the pretrained network may be obtained locally, or may be obtained remotely, for example from network storage. At block 215, a first batch of frames is obtained. According to one or more embodiments, the neural network may be refined by walking through batches of video image data. The first batch may include a predetermined number of frames of video image data.

At block 220, the training module 155 applies the pretrained network (e.g., pretrained network 190) to the first frame of the first batch to obtain an initial prediction. Initially, the batch includes the first batch, obtained at block 215. The pretrained network may provide some prediction, which may be cached for future reference. In addition, applying the pretrained network to the initial frame may generate network parameters which may also be cached for later reference.

The flowchart continues at block 225, where the training module 155 applies a current version of the network to all the frames in the batch using the shared model parameters across frames to obtain a set of current predictions. In one or more embodiments, the pretrained network step through each frame in the batch to obtain a set of predictions, herein referred to as current predictions. The predictions using the current network (e.g., the pretrained network after it has been refined) are considered current predictions, for purposes of this description.

At 225, the training module 155 also obtains a content loss term for the batch, based on a difference between a prediction for the first frame in the batch using the pretrained network, and a prediction for the first frame in the batch using the current network. For purposes of this description, the term content loss term is directed to a loss term that encourages the network to reduce deviating from the pretrained network. Before any refinement is performed on the current (learning) network, the prediction for the first frame of the first batch will be the same using the pretrained network and the current network. However, after the first batch, as will be described below, the first frame of the current batch may render a different prediction using the pretrained network and the current network. The content loss term may be calculated in any number of ways. Either the first frame may be used, or any combination of frames from the current batch. The content loss term may be expressed in a number of ways related to calculated distance between predictions. In one or more embodiments, an L2 norm calculation may utilized as the distance function.

The flowchart 200 continues at block 230, where the training module 155 determines a temporal consistency loss term for each frame in the batch based on the current prediction for the first frame and the current prediction for each of the remaining frames in the batch. According to one or more embodiments, the temporal consistency loss term provides a consistency loss across frames. Determination of the temporal term will be described in greater detail below with respect to FIG. 4. In general, the temporal consistency loss term is determined as a difference between the current prediction for a particular frame after the first frame, and a warped version of the current prediction to the first frame, to compensate for the motion from the first frame to the particular frame for which the temporal consistency loss term is being determined. As shown, optionally at 231, a validity or confirmation mask may be applied. The mask may be used to subselect pixels in the frame for which temporal consistency is to be determined. As an example, invalid pixels may be removed from consideration, such as pixels for which optical flow or other computations can not reliably be determined (e.g., if a pixel is occluded in one of the frames). As another example, a set of pixels may be selected within the frame based on content, such as in foreground segmentation and the like.

The flowchart 200 continues at block 235 where the training module 155 accumulates the content loss term and the temporal consistency loss terms for the current batch. According to one or more embodiments, the content loss term and the temporal consistency loss term may be combined with multipliers, which weight the terms, and thus provide a tradeoff between consistency and content. In one or more embodiments, the combined terms may be input into an optimizer to determine an optimal set of parameters for the current network in an optimized tradeoff between the content erm and a consistency term.

At block 240, the training module 155 refines the pretrained network based on the content loss term and the temporal consistency loss term for each frame. The optimized weights may then be fed back into the current neural network for later use. As such, the current neural network is now a refined version of the pretrained network, based on the content loss term and temporal consistency loss terms for the batch.

The flowchart continues at block 250 where a determination is made whether a convergence has been reached. A convergence metric may be utilized to determine when to stop processing batches, e.g., early stopping based on a metric based on a validation dataset of frames. If at block 250 a determination is made that a convergence has been met, then the flowchart concludes.

Returning to block 250, if a determination is made that a convergence has not been met, then the flowchart continues at block 250 and a determination is made regarding whether there are additional frames in the set. That is, whether there are additional batches to be processed, or whether additional data should be processed. As described above, the training data may be grouped into batches of video frames. According to one or more embodiments, a determination may be made that there are additional frames if additional batches remain unprocessed for the first set of frames.

If there are additional frames in the first set, then the flowchart 200 continues at block 255. At block 255, the training module 155 selects the next frame batch of un-annotated frames from the video feed. The flowchart 200 continues at block 220, where the pretrained network is applied to the first frame in the new batch of frames to obtain a new initial prediction. That is, the first frame of the selected next batch of un-annotated frames from block 235. The pretrained network that is applied to the first frame is the unrefined network from block 210, and not the refined, current network from block 240. The flowchart 200 continues until all additional frame batches have been processed, or the training module 155 otherwise determines to stop processing additional frames (e.g., a convergence is met). The result of flowchart 200 is a refined, current network 192 which provides image processing predictions in a temporally consistent manner and, thus, using a single network. Further, the resulting refined network allows for the ability to handle a single frame during inference, or multiple frames without regard for order of the frames. The refinement will not introduce any additional restrictions during inference.

Returning to block 250, if no further frames are left to be processed in the first set, then the flowchart continues at 260 and the training module 155 may continue training using a next set of frames, for example from the same video feed or a different video feed. As such, according to one or more embodiments, flowchart 200 may continue at 205 with a next set of un-annotated frames and training may resume. The flow continues until at block 245 a convergence is met.

Figure 3:
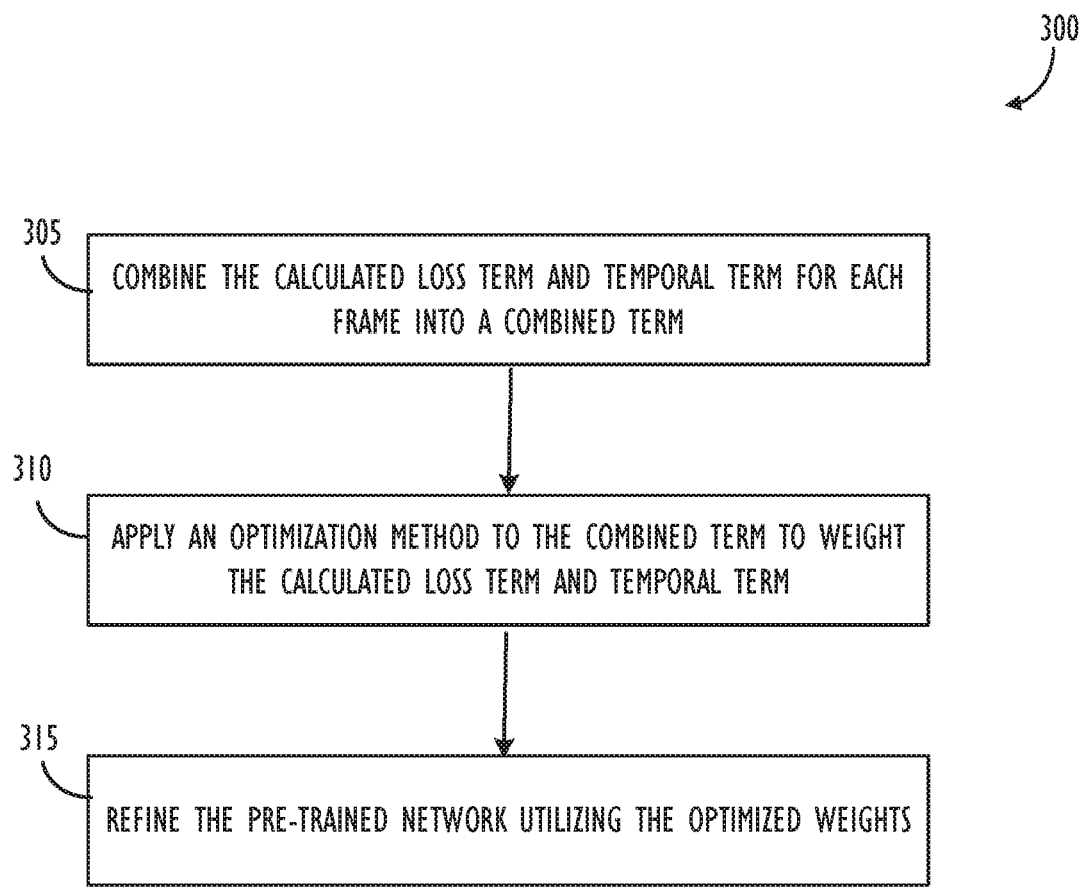
FIG. 3 shows, and flowchart form, a method of refining the free training network, according to one or more embodiments.

FIG. 3 shows, and flowchart form, a method 300 of refining a current, learning version of the pretrained network. For purposes of clarity, the flowchart 300 provides a detailed explanation of how the pretrained network is refined, for example at block 235 of FIG. 2, according to one or more embodiments. Although the various actions are depicted in a particular order, and some embodiments the various actions may be performed in a different order. In still other embodiments, two or more of the actions may occur simultaneously. According to yet another embodiment some of the actions may not be required with others may be included. For purposes of clarity, the flowchart will be described with respect to the various components of FIG. 1. However, it should be noted that according to one or more embodiments, additional and/or alternative components may perform the various processes to those described.

The flowchart 300 begins at block 305, where the training module 155 combines the content loss term and the temporal consistency loss term for each frame into a combined term. In one or more embodiments, the calculated loss term and temporal term may each be associated with a weight, which determines how a primary image processing task is weighted against temporal consistency.

The flowchart continues at block 310, where the training module 155 applies an optimization method to the combined term to which the content loss term and temporal consistency loss term. The flowchart concludes at block 315, where the training module 155 refines the pretrained network utilizing the optimized weights to obtain a current network.

Figure 4:
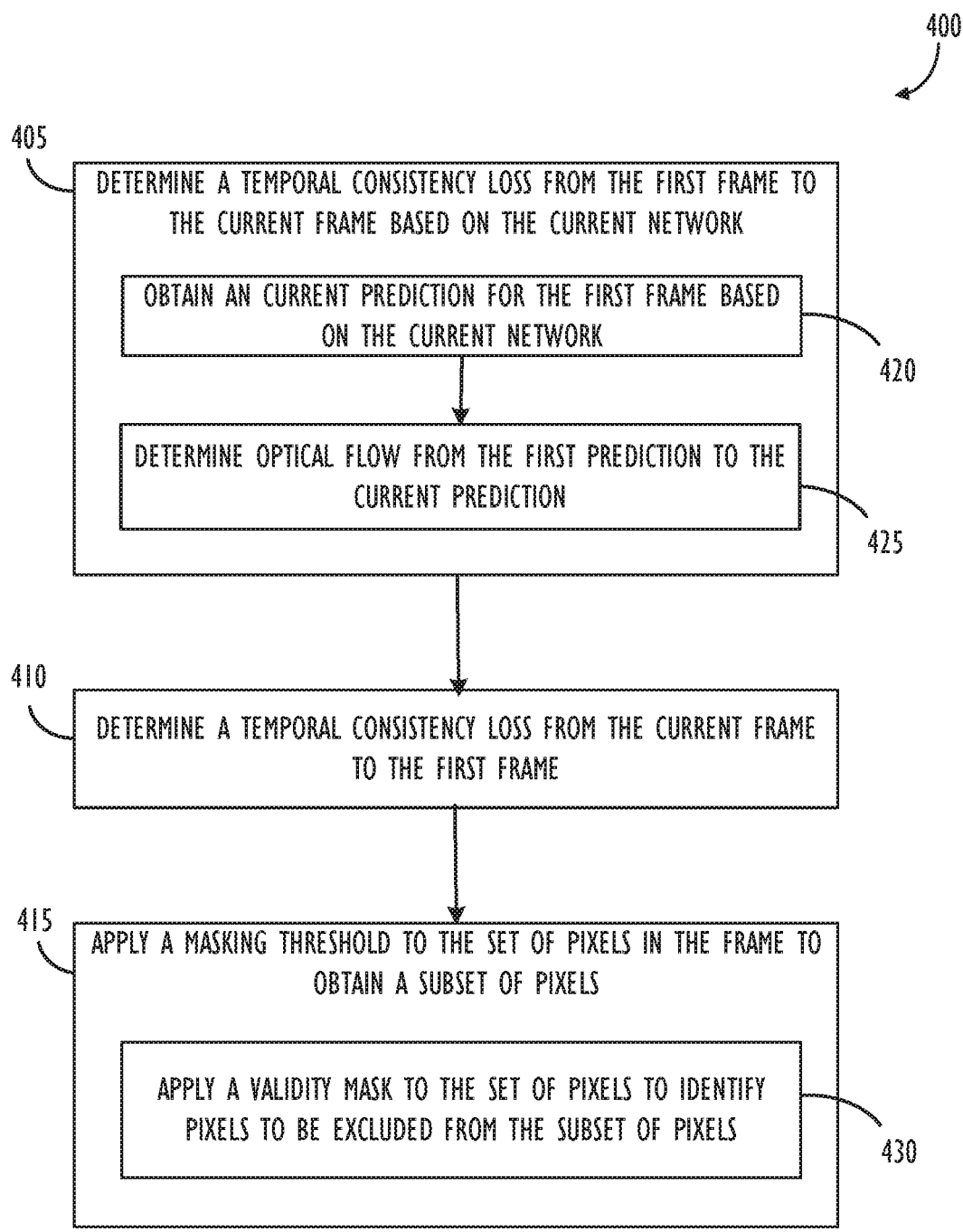
FIG. 4 shows an example flowchart depicting a method for refining a neural network for temporal consistency, according to one or more embodiments.

FIG. 4 shows, and flowchart form, a method 400 of determining a temporal term, according to one or more embodiments. For purposes of clarity, the flowchart 400 provides a detailed explanation of how the temporal term is determined for each frame, for example at block 240 of FIG. 2, according to one or more embodiments. Although the various actions are depicted in a particular order, and some embodiments the various actions may be performed in a different order. In still other embodiments, two or more of the actions may occur simultaneously. According to yet another embodiment some of the actions may not be required with others may be included. For purposes of clarity, the flowchart will be described with respect to the various components of FIG. 1. However, it should be noted that according to one or more embodiments, additional and/or alternative components may perform the various processes to those described.

The flowchart begins at block 405 where the training module 155 determines a consistency loss from the first frame to the current frame based on the current network (e.g., the refined network). In one or more embodiments, the temporal consistency loss term may be calculated based on a prediction for a particular frame from the current, refined network, and an interpolation of the prediction for the particular frame based on the current prediction for the first frame in the batch based on the current network.

In one or more embodiments, determining the temporal consistency loss term includes, at block 420, obtaining an current prediction for the first frame. As described above, the current prediction for the first frame may be determined based on the current network. Determining the temporal consistency loss term may also include, at block 425, determining optical flow from the current prediction for the first frame to the current frame (e.g., the prediction for the current frame). In one or more embodiments, the prediction based on the first frame may be determined in a number of ways, for example utilizing optical flow and a warping function to compensate for motion between the first frame and the current frame based on optical flow. In one or more embodiments, the optical flow may be predetermined (e.g., offline), or determined online. The consistency loss may be determined as difference between a prediction for a particular frame from the current, refined network, and an interpolation (e.g., resampling of pixels using optical flow) of the prediction for the particular frame based on the current prediction for the first frame of the batch.

The flowchart continues at block 410 where the training module 155 determines a temporal consistency loss term from the current frame to the last frame. According to one or more embodiments, temporal consistency loss term may be determined in both directions. That is, optical flow may be used from the first frame to the current frame, as well as the current frame to the first frame. Bidirectional computation of temporal consistency loss may help cover spatial regions which are occluded in one temporal direction to be revealed in the reverse direction.

The flowchart 400 concludes at 415, where the training module 155 applies a masking threshold to the set of pixels in the frame to obtain a subset of pixels. According to one or more embodiments, a masking function may be performed on the temporal consistency loss calculation in order to discard a number of pixels considered for training for temporal consistency. The mask may be, for example, an optical flow validity mask, which may utilize optical flow to identify valid pixels (e.g., pixels in a frame which can be used to train without error). As another example, the mask may be a segmentation mask, which may refine which portion of an image should be used for training. That is, the mask may be used to sub-select the data that should be considered for stabilization.

At 430, the flowchart 400 includes applying a validity mask to the set of pixels to identify pixels to be excluded from the subset of pixels. The validity mask may include, for example, an optical flow validity mask which may determine valid pixels due to, for example, disocclusion, sensitivity at the motion boundaries, or simply due to incorrect estimation. In one or more embodiments, the optical flow validity mask may include conditions which must be met in order for a pixel to be considered valid.

One example of a condition for which a violation indicates an invalid pixel includes, given backward and forward optical flow between two frames, a non-occluded pixel is mirrored, within a margin of error. Another example of a condition may be that motion boundaries exhibit steep gradients on the predicted optical flow between two frames, within a margin of error, where the steepness is compared to a threshold gradient value. Another example of a condition includes, in applications where the predictions of the neural network represent confidences (e.g., semantic segmentation rather than pixel intensity values) the mask may suppress pixels with a confidence values below a predetermined confidence threshold at both the first frame and the additional frame.

Figure 5:
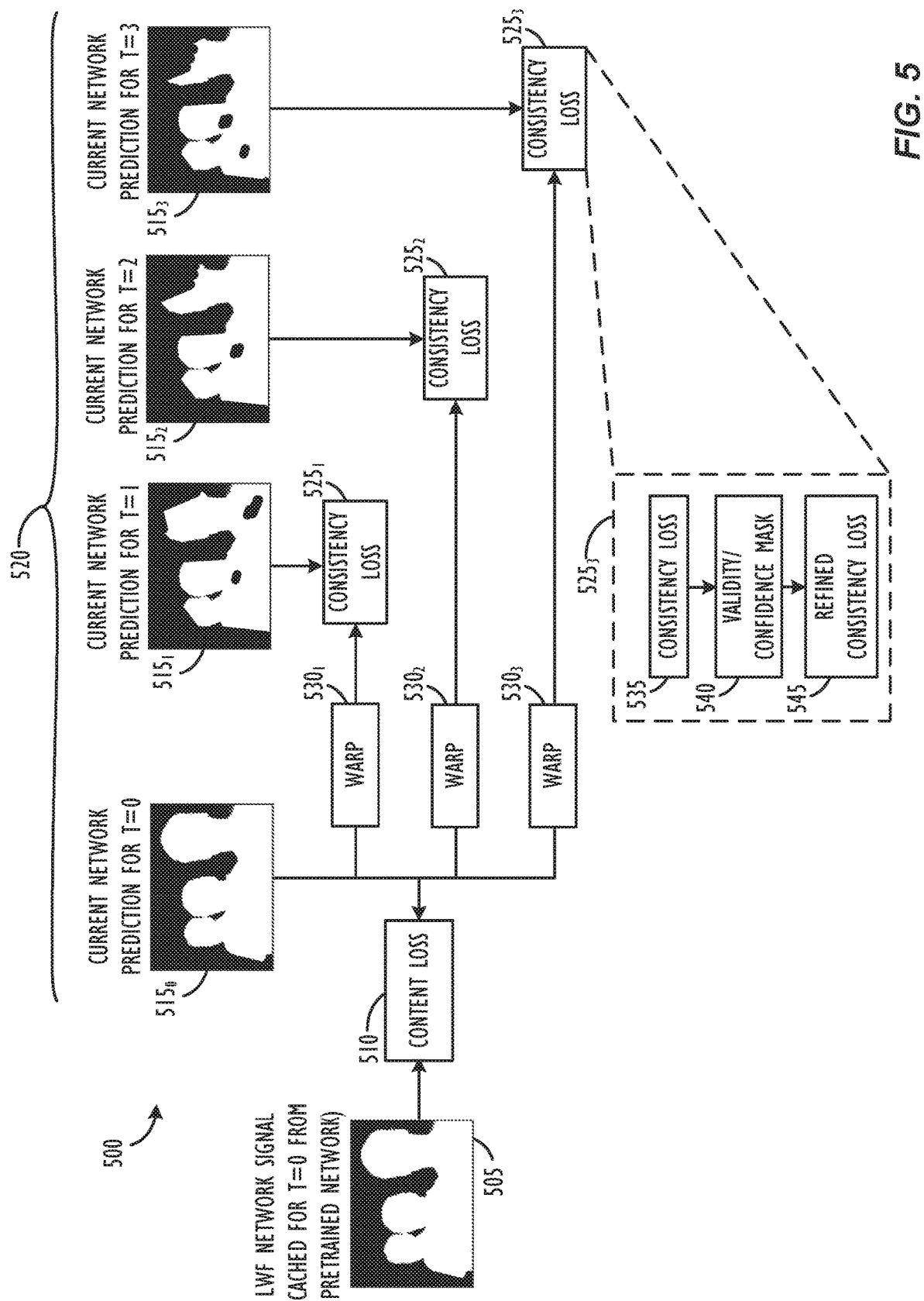
FIG. 5 shows an example system diagram depicting a method for refining a neural network to learn temporal consistency in addition to a primary task, according to one or more embodiments.

Turning now to FIG. 5, an example system diagram 500 depicting a method for refining a neural network to learn temporal consistency in addition to a primary task is shown, according to one or more embodiments. Example system diagram 500 depicts an example workflow for utilizing video image frames to train a neural network based on temporal consistency. The number of frames presented here is for exemplary purposes. In one or more embodiments, the number of frames used may change dynamically.

As depicted, video image data 505 is utilized from a network signal for training. For purposes of this example, video image data 505 may include a batch of video image frames. As described above, video image data 505 may be un-annotated video data. The pretrained network may be applied to a first frame of the batch of image data 505. In addition, current network may be applied to each frame of a particular batch of the video feed 505, as is shown at 520. More particularly, 520 represents a set of predictions that includes the prediction for each frame of the batch based on the current network. The current network may be a refined version of the pre-trained network. Further, each prediction of the set of predictions 520 may be predicted using a shared set of weights.

Prediction $515_0$ indicates a prediction for the first frame based on the current network. At 510, a content loss term is determined based on a difference between the prediction for the first frame based on the current network and the prediction for the first frame based on the pretrained network. The content loss term will be utilized for accumulation and optimization, as described above with respect to FIG. 2.

The temporal consistency loss term is determined by comparing the prediction for each frame using the current network to the first prediction for the first frame of the batch based on the pretrained network, utilizing a warping function for compensating for the movement between the first frame and the particular frame. As such, a warping function $530_1$ is applied to the current prediction for the first frame $515_0$ to determine the consistency loss $525_1$ from the current prediction for the second frame $515_1$. Similarly, warping function $530_2$ is applied to the current prediction for the first frame $515_0$ to determine the consistency loss $525_2$ based on the current prediction for the third frame $515_2$. Further, warping function $530_3$ is applied to the current prediction for the first frame $515_0$ to determine the consistency loss $525_3$ based on the current prediction for the fourth frame $515_3$.

According to one or more embodiments, the temporal consistency loss term may be refined at each step by taking the temporal consistency loss term 535, and applying the validity or confidence mask 540, as described above with respect to FIG. 4. The results is a refined temporal consistency loss term 545, according to one or more embodiments.

Figure 6:
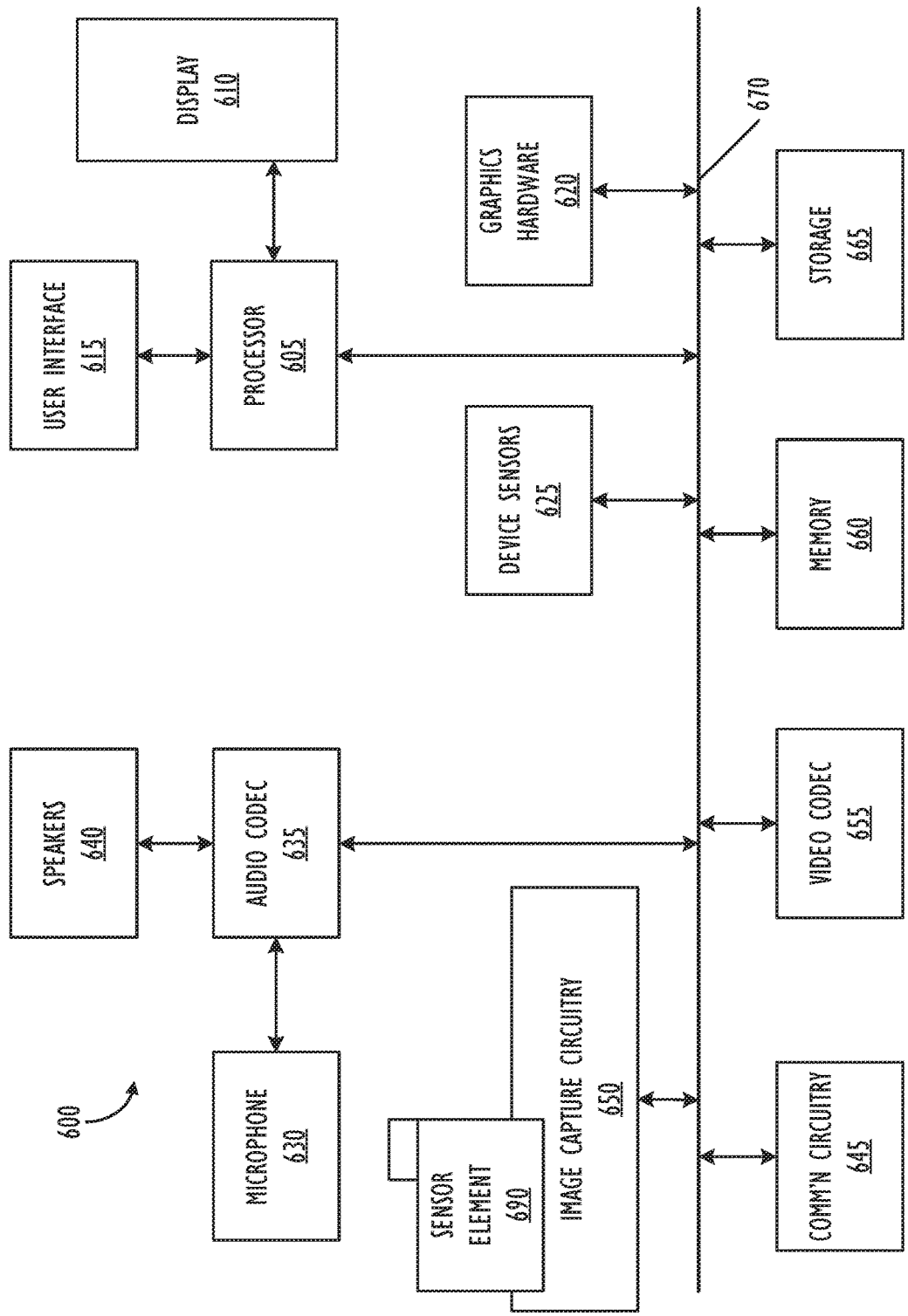
FIG. 6 shows, in block diagram form, a simplified multifunctional device according to one or more embodiments.

Turning to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650, video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680 associated with sensor element 690. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

As described above, one aspect of the present technology is the gathering and use of data available from various sources to generate models of people and to categorize image data. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to request and receive image data from remote users. Accordingly, use of such personal information data enables users to share information and communicate easily. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

The scope of the disclosed subject matter therefore should be determined with reference to the appended claims, along with the full scope of equivalents to which such claims are entitled.

The invention claimed is:

1. A non-transitory computer readable medium comprising computer readable code executable by one or more processors to:
   obtain a first plurality of frames from a video feed;
   apply a pretrained network to a first frame of a first frame set to obtain a first prediction;
   apply a current version of the pretrained network to each frame of the first frame set to obtain a first set of current predictions;
   determine a content loss term based on the first prediction a prediction for the first frame from the first set of current predictions;
   determine a temporal consistency loss term based on the first set of current predictions; and
   refine the pretrained network based on the content loss term and the temporal term to obtain a refined network.

2. The non-transitory computer readable medium of claim 1, wherein the pretrained network is trained on single-frame images, and wherein the pretrained network is trained without temporal consistency.

3. The non-transitory computer readable medium of claim 1, wherein the computer readable code to determine the content loss term further comprise computer readable code to:
   calculate a distance measure between the first prediction and the current prediction.

4. The non-transitory computer readable medium of claim 1, wherein the computer readable code to refine the pretrained network comprises computer readable code to:
   determine updates to model parameters during refinement; and
   utilize the model parameters to refine the pretrained network.

5. The non-transitory computer readable medium of claim 1, wherein the computer readable code to determine the temporal consistency loss term further comprises computer readable code to:
   determine a subset of pixels of a particular frame that are valid pixels, wherein the valid pixels are pixels to be used for stabilization.

6. The non-transitory computer readable medium of claim 5, wherein the subset of pixels are determined based on:
   determining a predicted set of pixels at the particular frame based on a current prediction for the first frame and an optical flow determination from the first frame to the particular frame,
   determining a distance between the predicted set of pixels and the pixels of the current prediction of the particular frame, and
   selecting the subset of pixels based on a determination that each pixel of the subset of pixels satisfies a predetermined masking threshold value based on the determined distance.

7. The non-transitory computer readable medium of claim 6, further comprising computer readable code to:
   further determine the predicted set of pixels at the particular frame based on the current prediction and an optical flow determination from the particular frame to the first frame.

8. A system for training a network for temporal consistency, comprising:
   one or more processors; and
   one or more computer readable media comprising computer readable code executable by the one or more processors to:
      obtain a first plurality of frames from a video feed;
      apply a pretrained network to a first frame of a first frame set to obtain a first prediction;
      apply a current version of the pretrained network to each frame of the first frame set to obtain a first set of current predictions;
      determine a content loss term based on the first prediction a prediction for the first frame from the first set of current predictions;
      determine a temporal term based on the first set of current predictions; and
      refine the pretrained network based on the content loss term and the temporal term to obtain a refined network.

9. The system of claim 8, wherein the pretrained network is trained on single-frame images, and wherein the pretrained network is trained without temporal consistency.

10. The system of claim 8, wherein the computer readable code to determine the content loss term further comprise computer readable code to:
    calculate a distance measure between the first prediction and the current prediction.

11. The system of claim 8, wherein the computer readable code to refine the pretrained network comprises computer readable code to:
    determine updates to model parameters during refinement; and utilize the model parameters to refine the pretrained network.

12. The system of claim 8, wherein the computer readable code to determine the temporal consistency loss term further comprises computer readable code to:
    determine a subset of pixels of a particular frame that are valid pixels, wherein the valid pixels are pixels to be used for stabilization.

13. The system of claim 12, wherein the subset of pixels are determined based on:
    determining a predicted set of pixels at the particular frame based on the current prediction and an optical flow determination from the first frame to the particular frame,
    determining a distance between the predicted set of pixels and the pixels of the current prediction of the particular frame, and
    selecting the subset of pixels based on a determination that each pixel of the subset of pixels satisfies a predetermined masking threshold value based on the determined distance.

14. The system of claim 13, further comprising computer readable code to:

further determine the predicted set of pixels at the particular frame based on the current prediction and an optical flow determination from the particular frame to the first frame.

15. A method for training a network for temporal consistency, comprising:

obtaining a first plurality of frames from a video feed;

applying a pretrained network to the first frame of first frame set to obtain a first prediction;

applying a current version of the pretrained network to each frame of the first frame set to obtain a first set of current predictions;

determining a content loss term based on the first prediction a prediction for the first frame from the first set of current predictions;

determining a temporal consistency loss term based on the first set of current predictions; and refining the pretrained network based on the content loss term and the temporal term to obtain a refined network.

16. The method of claim 15, wherein the pretrained network is trained on single-frame images, and wherein the pretrained network is trained without temporal consistency.

17. The method of claim 15, wherein determining the content loss term further comprises:

calculating a distance measure between the first prediction and the current prediction.

18. The method of claim 15, wherein refining the pretrained network comprises:

determine updates to model parameters during refinement; and utilize the model parameters to refine the pretrained network.

19. The method of claim 15, wherein determining the temporal consistency loss term further comprises:

determining a subset of pixels of a particular frame that are valid pixels, wherein the valid pixels are pixels to be used for stabilization, and wherein the subset of pixels are determined based on:

determining a predicted set of pixels at the particular frame based on the current prediction and an optical flow determination from the first frame to the particular frame, determining a distance between the predicted set of pixels and the pixels of the current prediction of the particular frame, and selecting the subset of pixels based on a determination that each pixel of the subset of pixels satisfies a predetermined masking threshold value based on the determined distance.

20. The method of claim 19, further comprising:

further determining the predicted set of pixels at the particular frame based on the current prediction and an optical flow determination from the particular frame to the first frame.

* * * * *